April 16, 1940.　　　W. H. ROWELL　　　2,197,594
SEED AND FERTILIZER TAPE
Filed Aug. 5, 1937
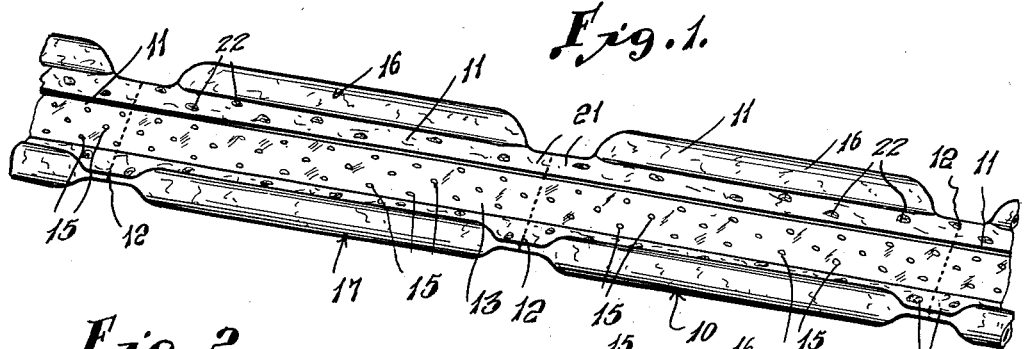
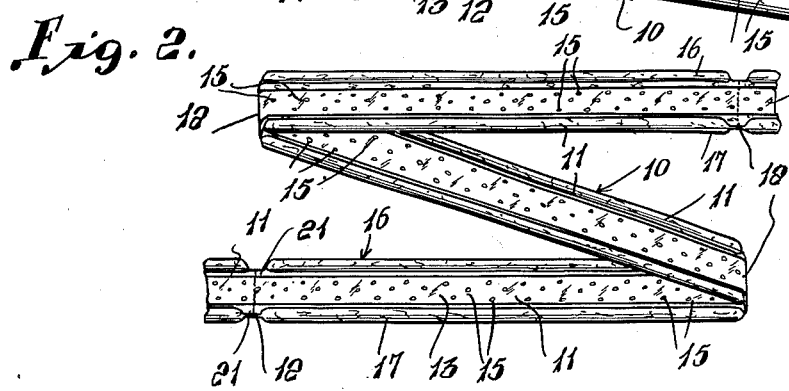
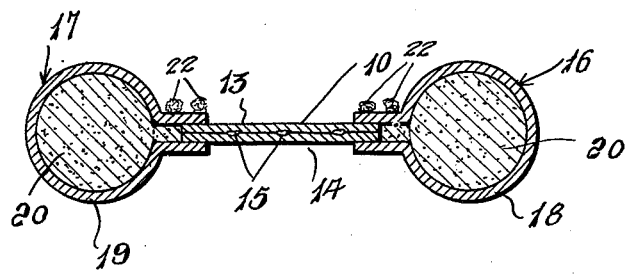
Inventor
W. H. Rowell
By L. F. Randolph
Attorney Patented Apr. 16, 1940

2,197,594

UNITED STATES PATENT OFFICE 2,197,594

SEED AND FERTILIZER TAPE

William Henry Rowell, Rutland, Vt., assignor of one-half to Orlo C. Lull, Rutland, Vt.

Application August 5, 1937, Serial No. 157,593

8 Claims. (Cl. 47—56)

This invention relates to an improved tape to contain seed and fertilizer.

The object of this invention is to provide a tape to contain a plurality of seeds arranged in spaced relationship as for planting, and suitably attached containing members for chemical fertilizer best suited to promote the growth of the seeds.

A further object of the invention is to form the seed and fertilizer holding members of a gelatinous moisture soluble material whereby the tape after planting will dissolve leaving the seeds properly spaced in the ground and surrounded by the fertilizer.

A further object of the invention is to form the containing members of a gelatinous material produced from the bones of animals which will tend to act as a fertilizer similar to bone meal after being dissolved.

Other objects and advantages of the invention will hereinafter become more apparent from the following specification of which the drawing forms a part, and wherein:

Figure 1 is a prespective view of several sections of the tape,

Figure 2 is a prespective view on a smaller scale showing several sections of the tape in a partially folded position illustrating one means by which the tape may be packed for shipment and sale, and Figure 3 is an enlarged cross sectional view of the tape.

Referring more particularly to the drawing wherein like reference characters designate like or corresponding parts in the different views, 10 designates generally the tape in its entirety, comprising a plurality of sections 11 which may be separated along the perforated lines 12. These perforations 12 are preferably separated by about a foot or a yard so that the tape 10 can be sold in any desired lengths from a reel on which it is wound, or may be folded as partially illustrated in Figure 2 and packed in a waterproof container such as a Cellophane bag. The perforations 12 also permit the tape to be cut-off by the user depending upon the length of the row which he desires to plant.

The tape 10 comprises the strips 13 and 14 of a soluble material preferably a gelatinous paper which is moistened on one side so that the seeds 15 which are scattered on one of the strips will be held in spaced relationship when the strips are secured together. Strips 13 and 14 have sufficient adhesive qualities so that a slight pressure on the strips will cause them to adhere together to hold the seeds 15. Strips 16 and 17 are rolled so that their opposite edges can be adhesively secured to the edges of the seed containing strips 13 and 14 as best seen in Figure 3. The intermediate portions 18 and 19 of strips 16 and 17 as shown, are formed to provide a cylindrical containing portion for a chemical fertilizer 20. Adjacent the perforated portions 12 the strips 16 and 17 are compressed as illustrated at 21 so that the tape 10 when divided into sections 11 will not leave the chemical fertilizer 20 exposed.

The members 16 and 17 are formed of a soluble, preferably gelatinous, paper which is slightly heavier than the strips 13 and 14 so that the strips 13 and 14 will be dissolved by the moisture in the ground before the cylindrical containers 18 and 19. Adhesively connected to one of the exposed edges of the members 16 and 17 are sponge particles 22 which are adapted to hold earth moisture to which the tape 10 is exposed for hastening the dissolution of portions of the members 16 and 17 which connect with the strips 13 and 14.

The containing portions 18 and 19 for the chemical fertilizer 20 have been shown as cylindrical but may equally well be of any other shape. The intermediate portions 21 of the members 16 and 17 adjacent the perforations 12 may be formed in any suitable manner such as by moistening the members and applying pressure. The strips 13 and 14 are transparent so that the seeds 15 are visible and subject to inspection by the purchaser in regard to quantity and arrangement. The gelatinous members 13, 14, 16 and 17 are manufactured from a bone product so that when they are dissolved by the moisture in the ground they will assist in the growth of the seeds contained therein.

In using the tape one end may be attached by a suitable clip or peg while the tape is stretched the desired length of the row, after which it is covered with dirt to a proper depth and cut-off along one of the perforated lines 12. The peg then being removed. In this way gardening may be begun either on a large or small scale much more scientifically and with much less effort. It has been found that the seeds develop when planted in this manner in practically the same time as when scattered in the earth. This being attributed to the beneficial properties of the gelatinous strips, and also to the chemical fertilizer 20 which may be chemically tested and adapted to the particular type of seed 15 with which it is to be associated. It is desirable that strips 13 and 14 be thin enough so that they will be quickly dissolved by the ground moisture and their growth can begin before the heavier strips 16 and 17 are dissolved to expose the fertilizer 20.

It is to be understood that only the preferred embodiment of the invention has been herein shown and described for the purpose of illustration, the right being reserved to make such changes and modifications in the structure and arrangement of parts as will not depart from the spirit and scope of the invention as hereinafter claimed.

I claim as my invention:

1. An article of the class described comprising strips of naturally adhesive soluble material secured together by their natural adhesiveness in superposed relationship, a plurality of seeds arranged and held in spaced relationship between said strips, and tubular members secured to each edge of said superposed strips and containing a fertilizer.

2. A seed and fertilizer tape including soluble strips adhesively secured in superposed relationship, seed arranged between said strips, a strip of soluble material rolled lengthwise upon itself, and having its opposite edges secured to one edge of said superposed strips, and the interior of the intermediate portion of said rolled strip forming a container for fertilizer.

3. A seed and fertilizer tape comprising in combination with strips of soluble material adhesively secured together, seeds arranged and held in spaced relationship between said strips, fertilizer containers having edges secured to the edges of said seed containing strips, said fertilizer containers being formed of a soluble material, and sponge particles adhesively connected to the tape adjacent to the connected edges of the strips and containers.

4. A fertilizer and seed tape comprising superposed strips of soluble material adhesively connected, seeds arranged in spaced relationship between said strips, soluble members secured to the edges of said seed strips, said members being provided with longitudinally spaced cylindrical portions adapted to contain fertilizer, and the seed strip being perforated between said cylindrical portions whereby the tape can be divided into sections.

5. A seed and fertilizer tape comprising superposed strips of soluble material, seeds arranged and held between said strips, fertilizer containing members having edges secured to the edges of said strips and provided with longitudinally spaced cylindrical portions adapted to contain a filler of fertilizer, said members being formed of a less soluble material than said strips, and sponge particles adhesively connected to said tape adjacent to the connected edges of the strips and container members, said tape being perforated at spaced intervals between said cylindrical portions to allow the sections formed thereby to be separated without exposing the fertilizer.

6. An article of the class described comprising a seed tape composed of superposed soluble adhesive strips, seeds secured between said strips, soluble adhesive containing members secured to the longitudinal edges of said strips and provided with spaced cylindrical portions adapted to contain fertilizer, and means whereby said tape with the fertilizer containers attached can be separated into sections without exposing the fertilizer.

7. In a planting tape, strips of naturally adhesive soluble material secured in superposed relationship by the natural adhesiveness thereof and containing a plurality of seeds arranged and held in spaced relationship, and naturally adhesive soluble containers secured to the longitudinal edges of said strips by the adhesive properties thereof for containing a filler of fertilizer, said strips and containers varying in thickness to vary their dissolvability.

8. An article as in claim 7, and means secured to said tape for holding moisture.

WILLIAM HENRY ROWELL.